(12) United States Patent
Kuo

(10) Patent No.: US 7,466,494 B2
(45) Date of Patent: Dec. 16, 2008

(54) COMPACT ZOOM LENS

(75) Inventor: Chung-Yuan Kuo, Taichung (TW)

(73) Assignee: Asia Optical Co., Inc, Taichung (TW)

( * ) Notice: Subject to any disclaimer, the term of this patent is extended or adjusted under 35 U.S.C. 154(b) by 0 days.

(21) Appl. No.: 11/465,059

(22) Filed: Aug. 16, 2006

(65) Prior Publication Data
US 2007/0041102 A1 Feb. 22, 2007

(30) Foreign Application Priority Data
Aug. 18, 2005 (TW) .............................. 94128249 A

(51) Int. Cl.
*G02B 15/14* (2006.01)

(52) U.S. Cl. ........................ 359/680; 359/681; 359/682
(58) Field of Classification Search ................. 359/680, 359/681, 682, 691
See application file for complete search history.

(56) References Cited

U.S. PATENT DOCUMENTS

| | | | | |
|---|---|---|---|---|
| 5,076,677 A * | 12/1991 | Sato | ........................... | 359/680 |
| 5,587,840 A * | 12/1996 | Itoh | ........................... | 359/686 |
| 5,619,381 A | 4/1997 | Anderson | | |
| 6,429,978 B2 * | 8/2002 | Nishio | ........................ | 359/686 |
| 6,590,716 B2 | 7/2003 | Narimatsu | | |
| 7,038,857 B1 * | 5/2006 | Kuo | ........................... | 359/680 |
| 7,242,533 B2 * | 7/2007 | Ito | .............................. | 359/691 |
| 7,277,232 B2 * | 10/2007 | Sato | ........................... | 359/682 |
| 7,375,899 B2 * | 5/2008 | Kuo | ........................... | 359/676 |

* cited by examiner

*Primary Examiner*—David N Spector

(57) ABSTRACT

A compact zoom lens includes a first lens group (1, 3) of negative refractive power disposed on an object side and a second lens group (2, 4) of positive refractive power disposed on an image side. Both the first and second lens groups are movable. The first and second lens groups defines a variable distance therebetween. During zooming from the wide-angle end to the telephoto end, the second lens group moves toward the object side and the variable distance between the first and second lens groups decreases. The compact zoom lens has a long back focal length with various aberrations satisfactorily corrected.

23 Claims, 13 Drawing Sheets

COMPACT ZOOM LENS

BACKGROUND OF THE INVENTION

1. Field of the Invention

The present invention relates to a zoom lens, and particularly relates to a compact zoom lens for use in an image projection optical system of an image projection device and also for use in an image pickup optical system of an image pickup device. The compact zoom lens is a non-telecentric lens particularly suitable for use in a high-resolution mobile image projection device.

2. Description of Prior Art

As an important element of an image projection optical system or an image pickup optical system, optical lenses are generally required to satisfy the high zoom ratio and high-resolution requirements. A high zoom ratio lens generally consists of a plurality of lens groups and a considerable number of constituent lens elements, whereby the overall length of the lens is rather long. To meet the additional high-resolution requirement, special low dispersion lens elements and aspheric lens elements are further incorporated in the lens. Conventional zoom lenses are generally designed for image pickup purposes, and accordingly the back focal length of the zoom lens is normally short but can meet the requirements of the image pickup device. However, such a conventional zoom lens cannot be applied to an image projection device due to its short back focal length. For example, for a liquid crystal projector, a projection zoom lens used therein is required to have a long enough back focal length to provide room for a color synthesizing optical system of the projector and also to satisfy the high resolution requirement conforming to the high resolution of the liquid crystal panels of the projector. To satisfy these requirements, various zoom lenses for use in an image projection optical system have been proposed, for example, in U.S. Pat. Nos. 6,590,716 and 5,619,381.

U.S. Pat. No. 6,590,716 discloses a conventional projection zoom lens that comprises four lens groups including twelve constituent lens elements. This conventional projection zoom lens effectively reduces various aberrations and improves the quality of a projected image. However, there is recently not only a demand for an image with high resolution but also a demand for reduction in size and weight of the projector with importance attached to maneuverability and portability of the projector with a small panel. Compact projectors have been found to be incorporated into notebook computers, desktop computers, DVDs, and so on. Therefore, this conventional projection zoom lens is not fit for use in a compact projector because an optical system employing the four-group zoom lens will be bulky, and the manufacturing cost thereof will be increased and the assembly thereof will be complicated.

A compact two-group movable lens is disclosed in U.S. Pat. No. 5,619,381. This compact two-group lens includes a zoom lens group having a negative refractive power and a compensator group having a positive refractive power. Both groups contain at least one aspheric lens element for elimination of aberrations. A projection optical system employing this movable lens has a low distortion and high resolution with fewer lens elements. However, this patent only roughly introduces the configuration and the function of the two-group movable lens, and does not provide any detailed description of conditions and parameters necessary to the design.

To obtain the desired zoom ratio, image resolution and optical performance within the entire zoom range, the lens configuration for each lens group of a projection zoom lens must be carefully designed. When the refractive power of the lens group is increased, the movement stroke of the lens group during zooming will be shortened and thus the overall length of the zoom lens can be reduced. However, the increase in refractive power of the lens group will bring the problem of aberration fluctuations during zooming, and these aberration fluctuations are difficult to correct.

Accordingly, how to reduce the size and weight of the whole zoom lens system while maintaining high optical performance is a problem encountered by a zoom lens designer.

SUMMARY OF THE INVENTION

Accordingly, the object of the present invention is to provide a compact zoom lens with a simplified lens configuration having high optical performance and high image resolution, and being low-cost while a sufficient back focal length required for a projector is secured.

To achieve the above object of the present invention, a compact zoom lens in accordance with the present invention comprises, in order from an object side to an image side, a first lens group of negative refractive power and a second lens group of positive refractive power. Both the first and second lens groups are movable. The first lens group is disposed adjacent to the object side A first variable distance is defined between the first and second lens groups. The compact zoom lens further includes an aperture stop. When zooming from the wide-angle end to the telephoto end, the second lens group moves from the image side to the object side, and the first variable distance between the first and second lens groups decreases.

The present compact zoom lens satisfies the following conditions:

$$0.78 < \left|\frac{f2}{f1}\right| < 0.98 \tag{a-1}$$

$$1.44 < \left|\frac{f1}{fa}\right| < 1.99 \tag{a-2}$$

$$1.387 < \left|\frac{f2}{fa}\right| < 1.55 \tag{a-3}$$

$$0.58 < \left|\frac{fa}{bf}\right| < 0.68 \tag{a-4}$$

$$4.684 < \left|\frac{tt}{fa}\right| < 5.82 \tag{a-5}$$

$$2.852 < \left|\frac{tt}{bf}\right| < 3.80 \tag{a-6}$$

$$1.13 < \left|\frac{ex}{bf}\right| < 1.43 \tag{a-7}$$

$$0.649 < \left|\frac{lt}{tt}\right| < 0.723 \tag{a-8}$$

where f1 represents the focal length of the first lens group, f2 represents the focal length of the second lens group, fa represents the focal length of the entire compact zoom lens of the present invention at the wide-angle end, bf represents the back focal length of the entire compact zoom lens of the present invention at the wide-angle end, tt represents the total optical track of the entire compact zoom lens of the present invention at the wide-angle end, ex represents the exit pupil position of the entire compact zoom lens of the present invention at the wide-angle end, and lt represents the overall optical length from a front vertex of the first lens element to a rear vertex of the last lens element of the present compact zoom lens at the wide-angle end.

To correct aberrations, aspheric lenses are employed by the present compact zoom lens. The aspheric surfaces of the aspheric lenses are expressed by the following formula:

$$\frac{X(H^2/R)}{\{1+[1-2(1+K)(H/R)]^{1/2}\}} + AH^4 + BH^6 + CH^8 + DH^{10}$$

where X represents displacement in the direction of the optical axis at the position of height H from the optical axis relative to the surface vertex; R is the curvature radius of the aspheric lens surface on the optical axis; H represents a height of a point on the aspheric surface with respect to the optical axis; K represents a cone constant; and A, B, C and D are aspheric coefficients for fourth, sixth, eighth and tenth order terms.

In comparison with the prior art, the present zoom lens has a compact structure and is cost-effective since only two lens groups of negative and positive refractive power are employed. A long back focal length for various aberration corrections is also secured by the present compact zoom lens. Both zooming and focusing are effected by the movement of the first and second lens groups. Various aberrations accompanying zooming can be effectively corrected so as to ensure high optical performance. When the present zoom lens is applied to an image projection device such as a DMD (Digital Micro-mirror Device) projector, a small-size, light-weight and low-cost projector can be obtained while ensuring a high-resolution projection image.

BRIEF DESCRIPTION OF THE DRAWINGS

The present invention may best be understood through the following description with reference to the accompanying drawings, in which:

FIGS. 3A~3E respectively show longitudinal spherical aberration, lateral chromatic aberration, field curvature, distortion and MTF curves of Numerical Embodiment 1 of the present compact zoom lens at the wide-angle end;

FIGS. 4A~4E respectively show longitudinal spherical aberration, lateral chromatic aberration, field curvature, distortion and MTF curves of Numerical Embodiment 1 of the present compact zoom lens at an intermediate zoom position;

FIGS. 5A~5E respectively show longitudinal spherical aberration, lateral chromatic aberration, field curvature, distortion and MTF curves of Numerical Embodiment 1 of the present compact zoom lens at the telephoto end;

FIGS. 6A~6E respectively show longitudinal spherical aberration, lateral chromatic aberration, field curvature, distortion and MTF curves of Numerical Embodiment 2 of the present compact zoom lens at the wide-angle end;

FIGS. 7A~7E respectively show longitudinal spherical aberration, lateral chromatic aberration, field curvature, distortion and MTF curves of Numerical Embodiment 2 of the present compact zoom lens at an intermediate zoom position; and FIGS. 8A~8E respectively show longitudinal spherical aberration, lateral chromatic aberration, field curvature, distortion and MTF curves of Numerical Embodiment 2 of the present compact zoom lens at the telephoto end.

DETAILED DESCRIPTION OF THE INVENTION

Figure 1:
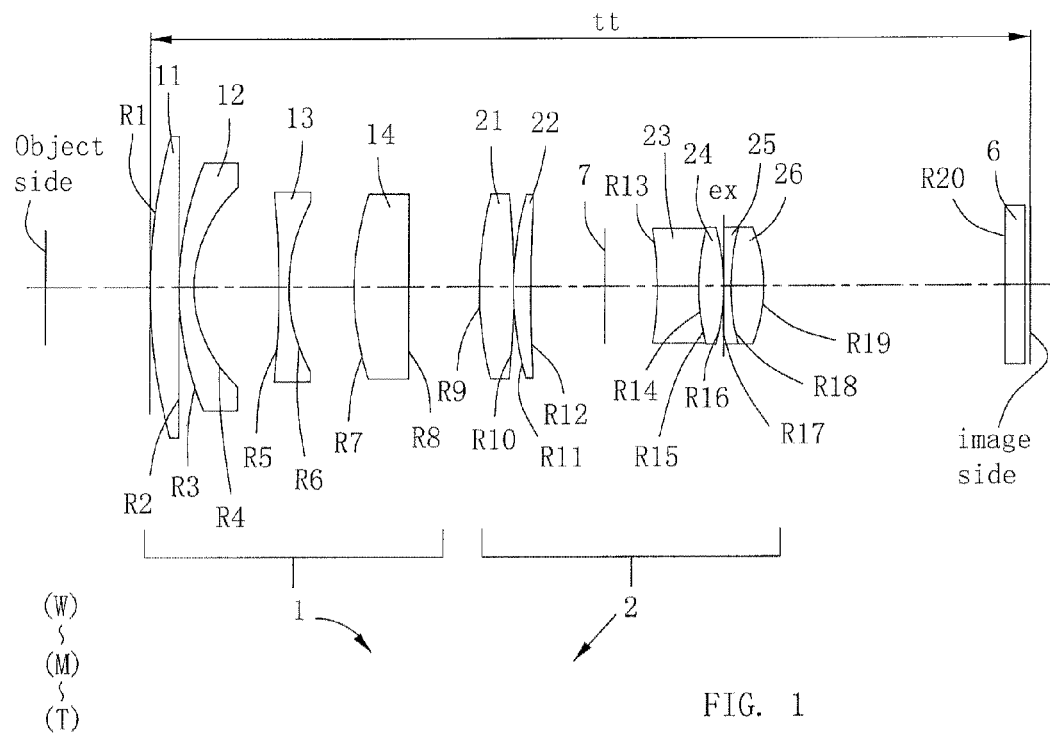
FIG. 1 schematically shows the construction of a compact zoom lens according to Numerical Embodiment 1 of the present invention.
Figure 2:
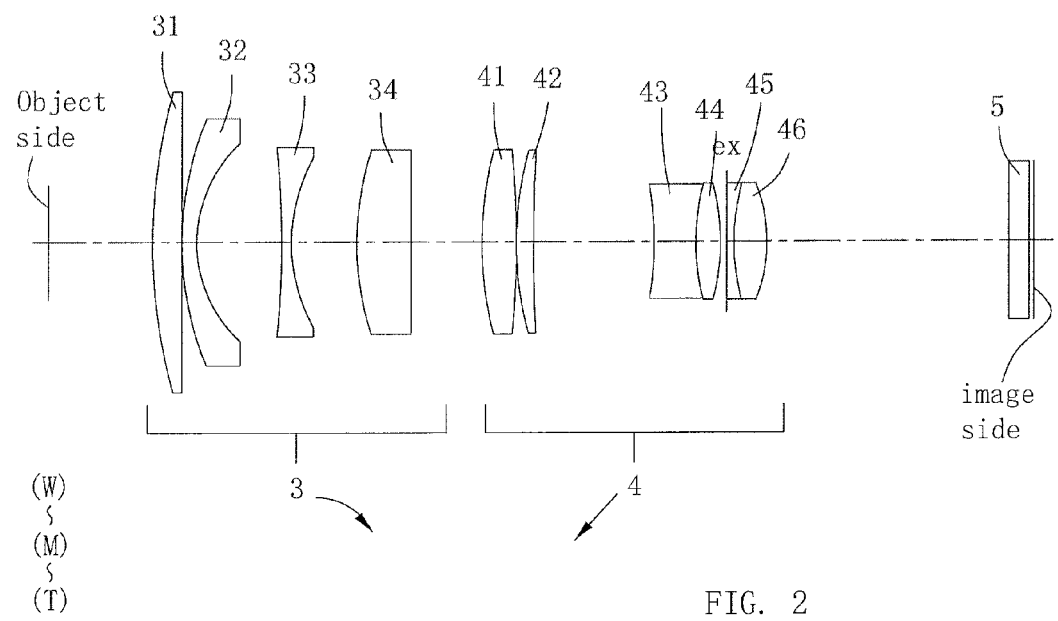
FIG. 2 schematically shows the construction of a compact zoom lens according to Numerical Embodiment 2 of the present invention.
Figure 3A:
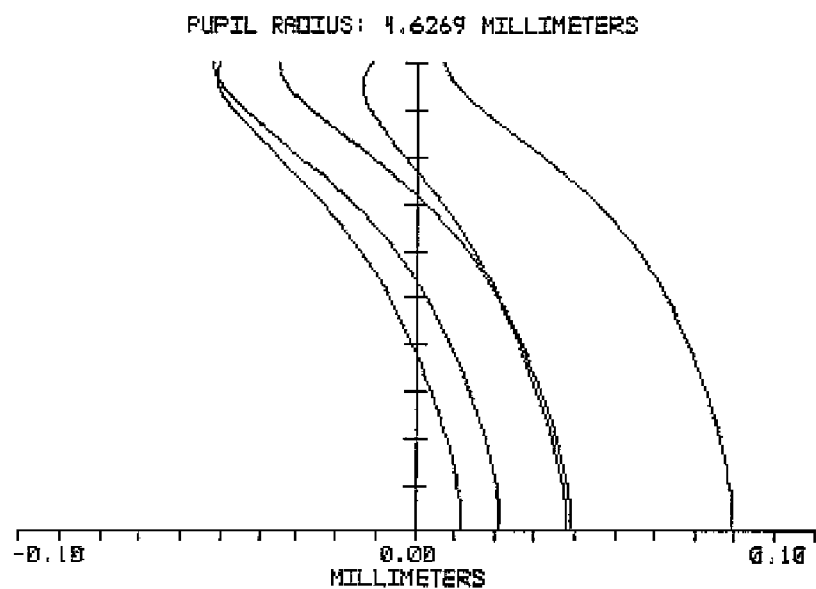
Figure 3B:
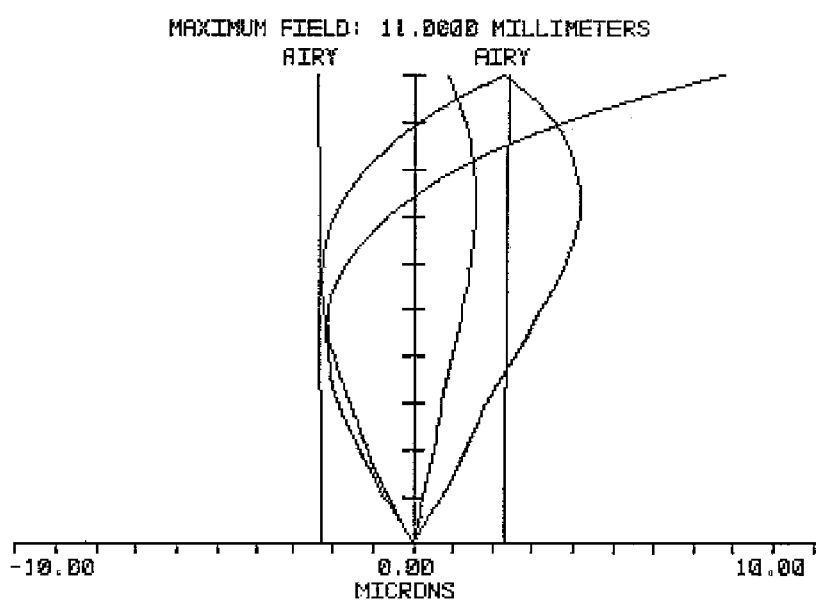
Figure 3E:
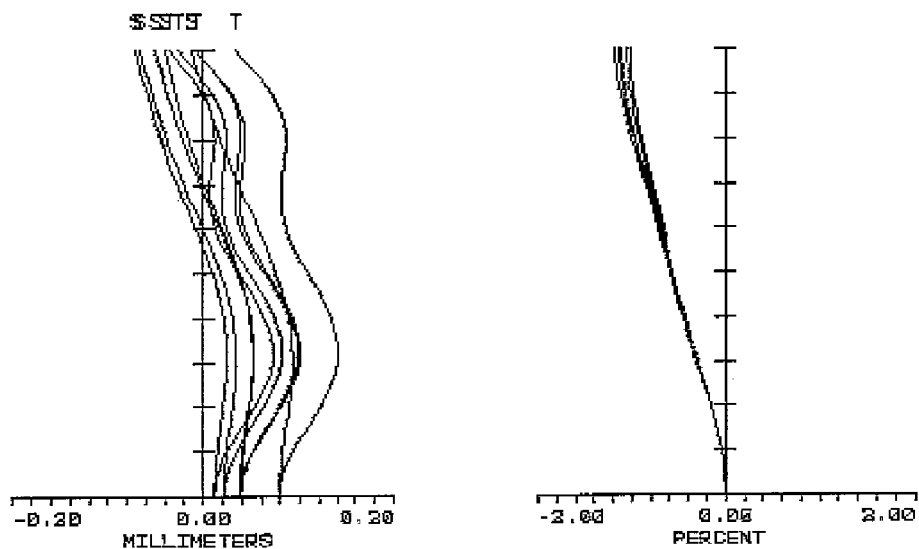
Figure 3E:
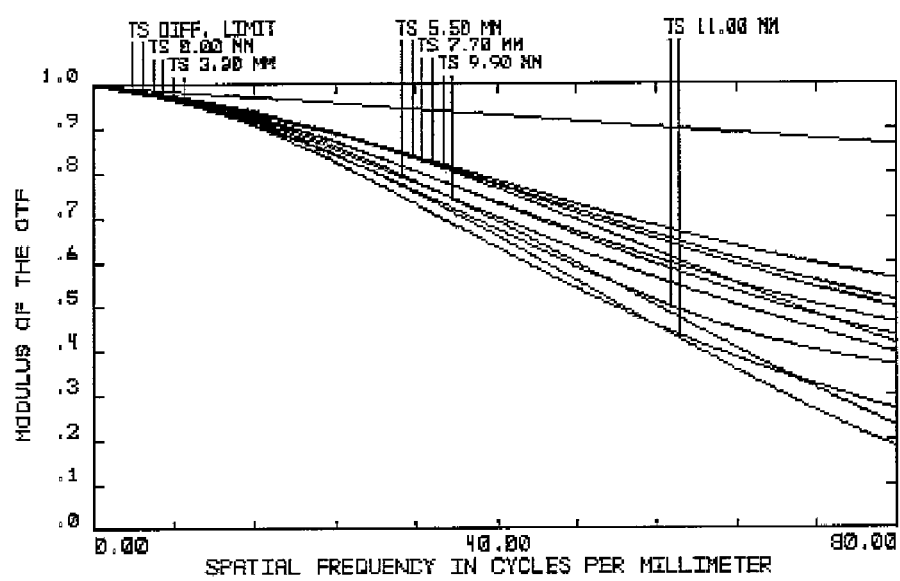
Figure 4A:
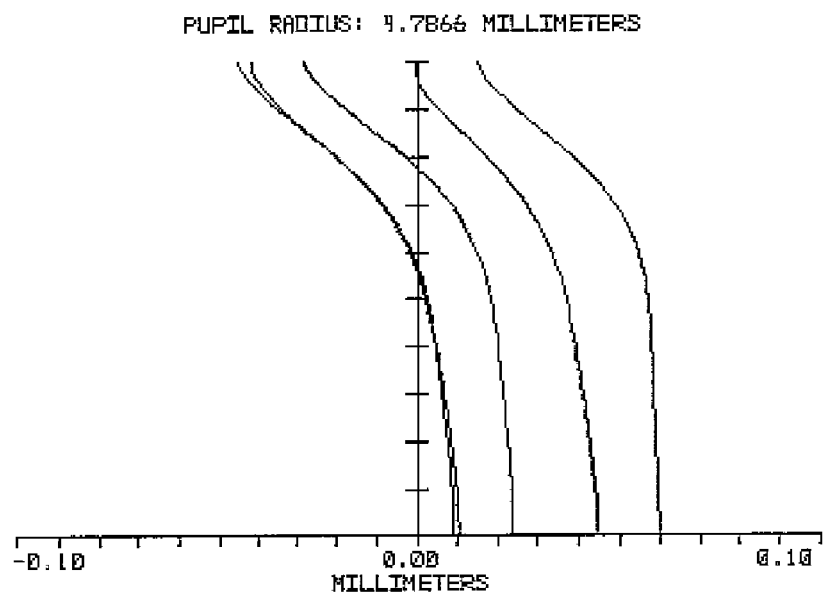
Figure 4B:
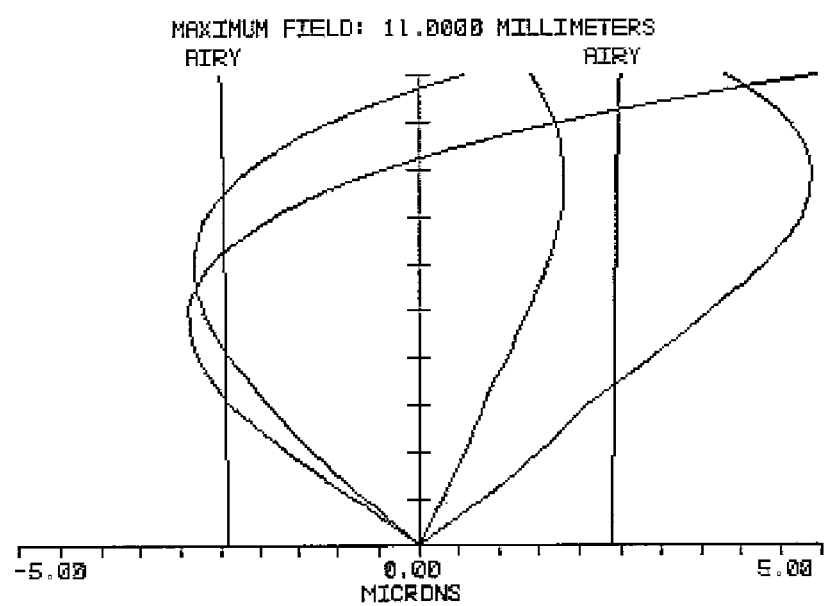
Figure 4E:
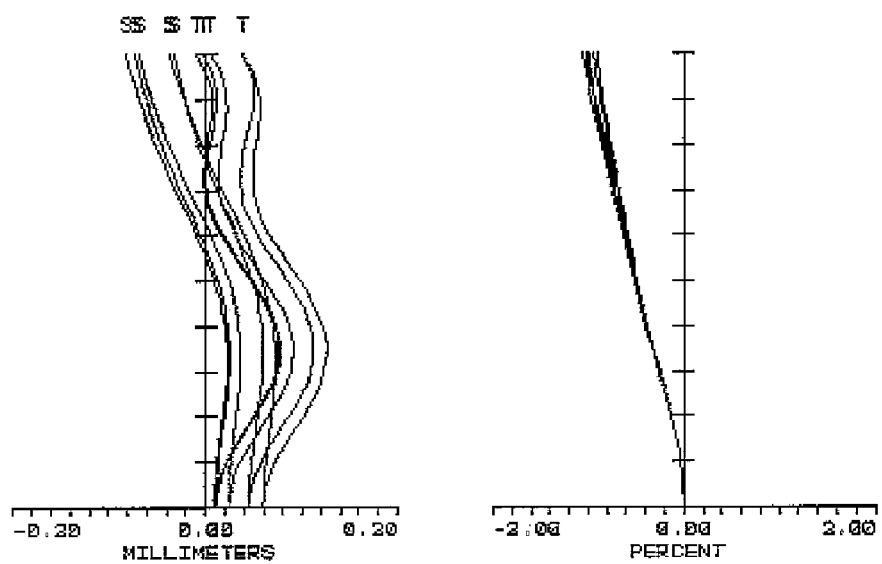
Figure 4E:
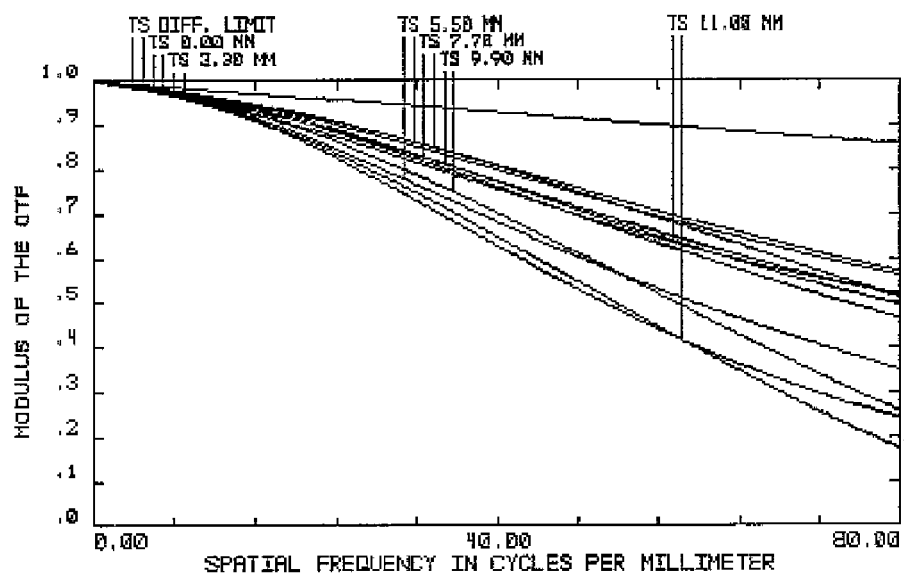
Figure 5A:
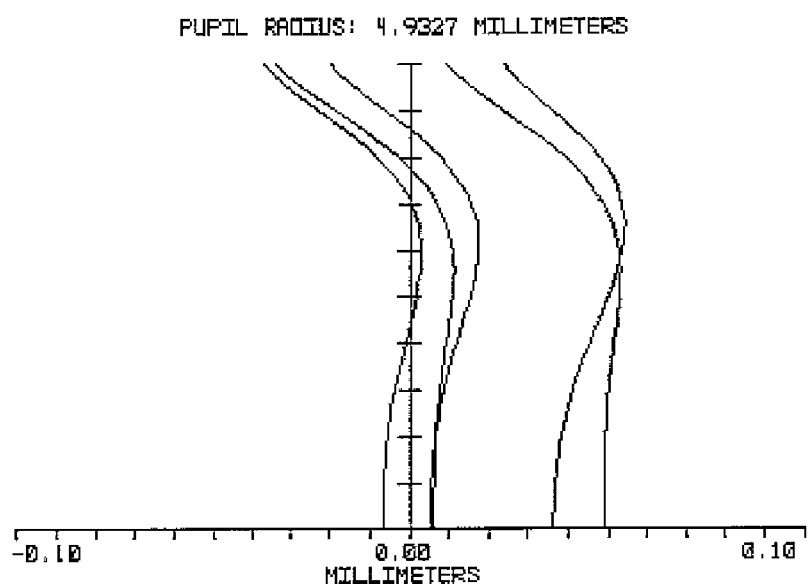
Figure 5B:
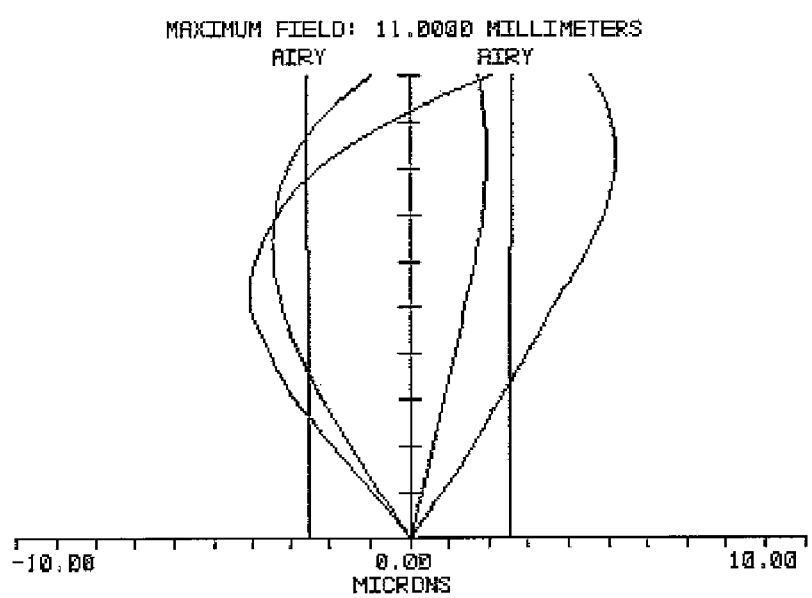
Figure 5E:
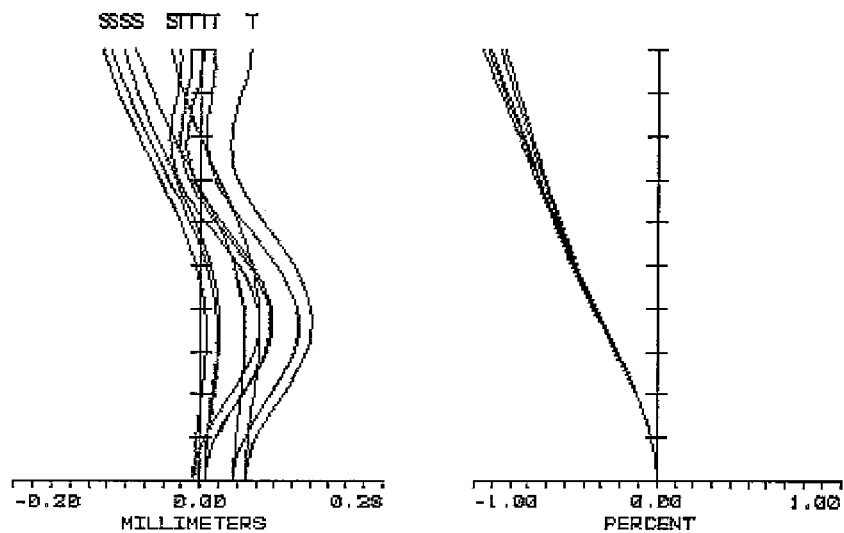
Figure 5E:
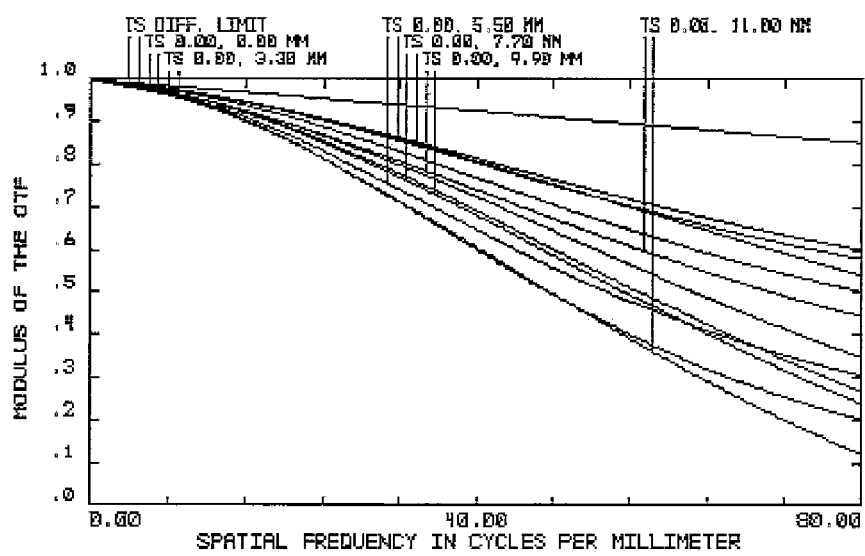
Figure 6A:
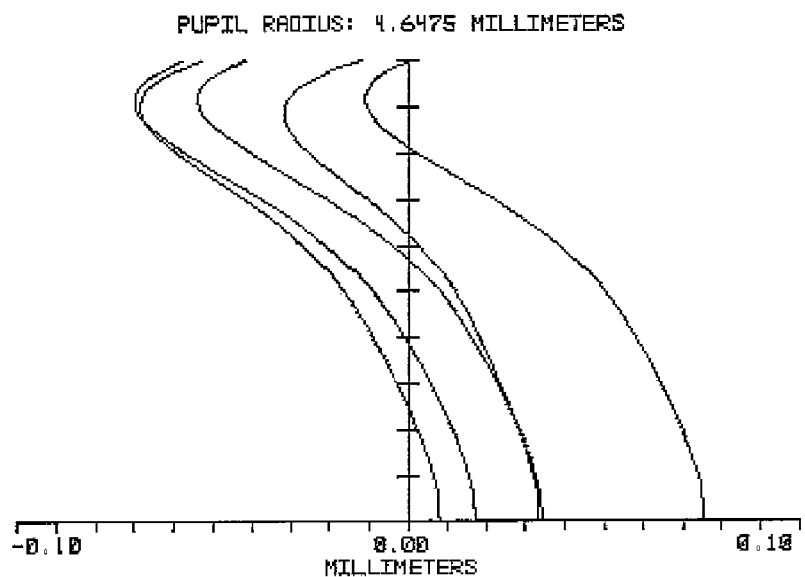
Figure 6B:
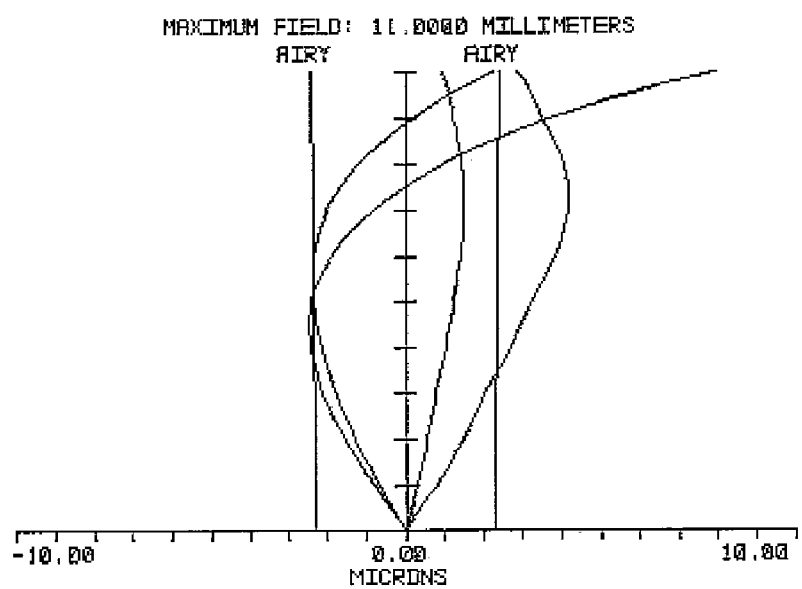
Figure 6E:
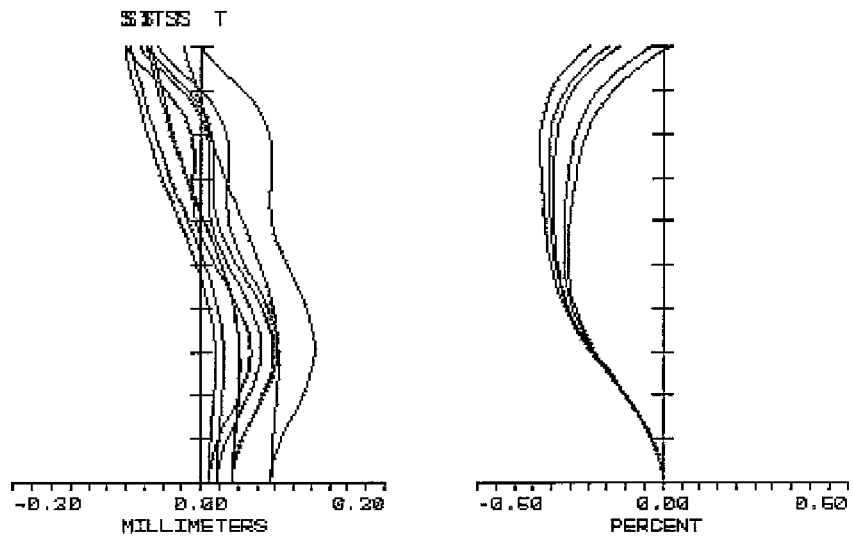
Figure 6E:
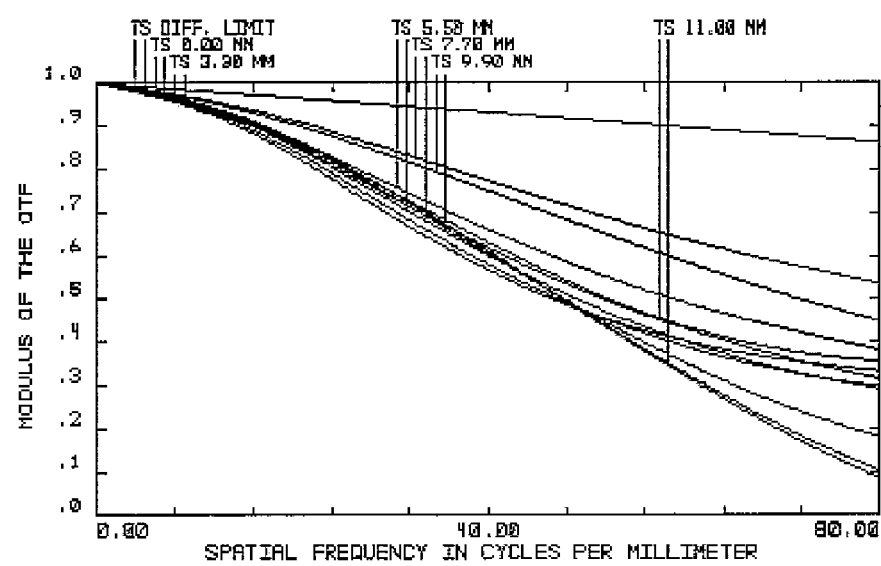
Figure 7A:
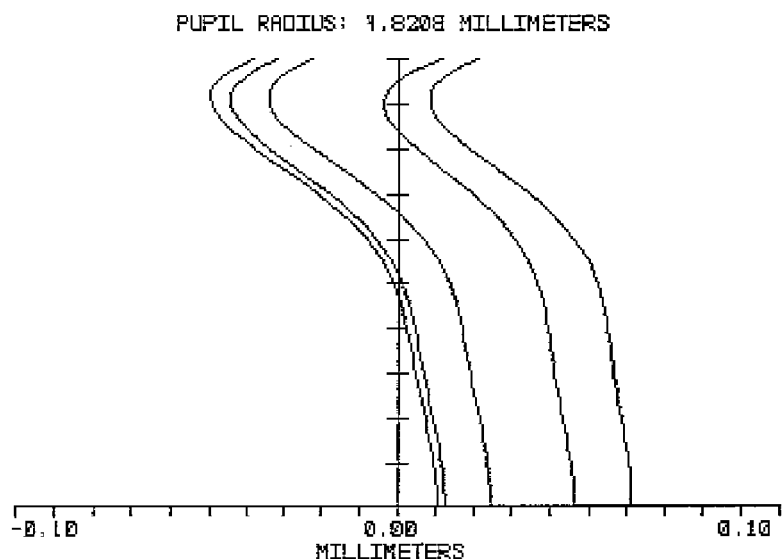
Figure 7B:
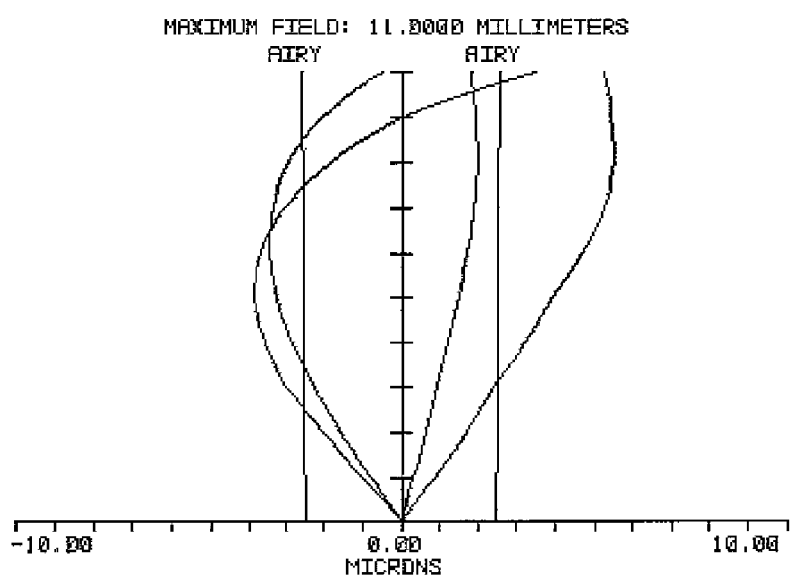
Figure 7E:
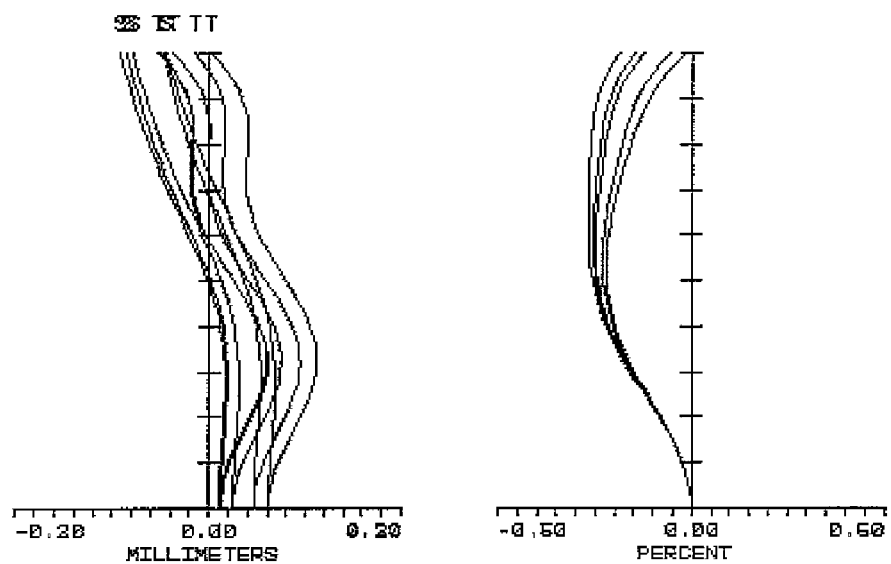
Figure 7E:
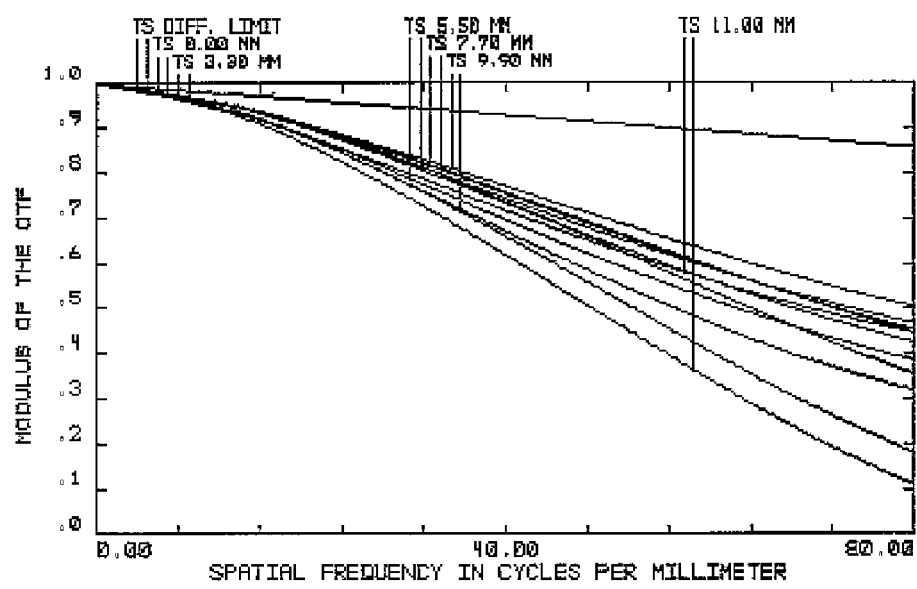
Figure 8A:
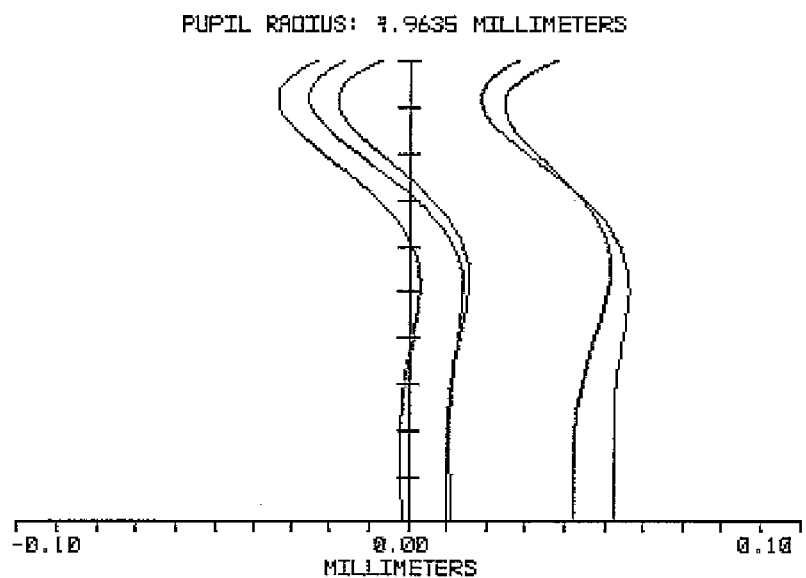
Figure 8B:
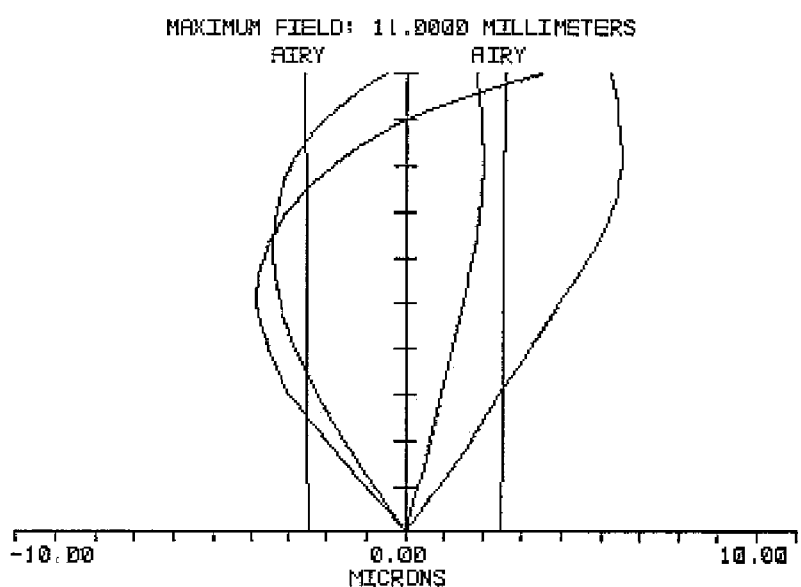
Figure 8E:
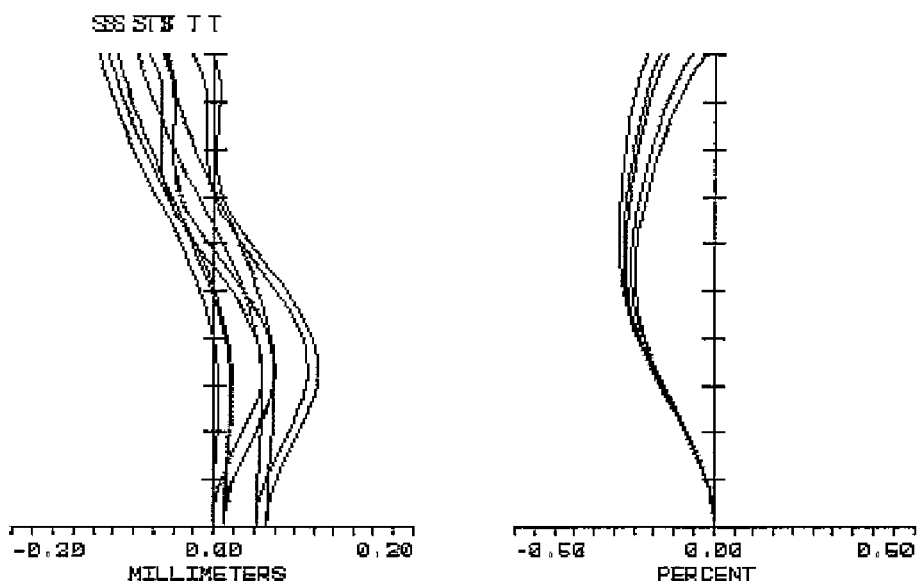
Figure 8E:
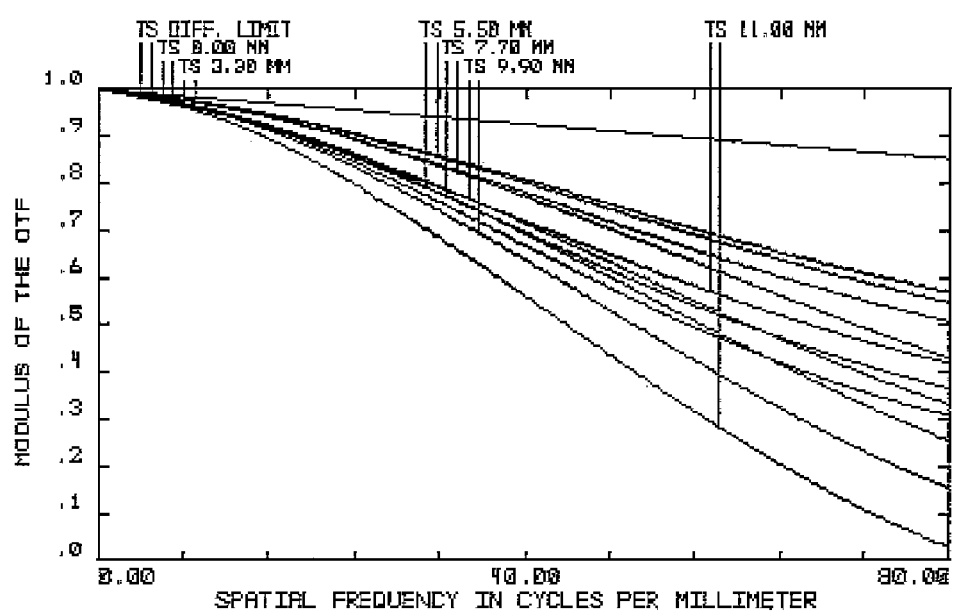

FIGS. 1 and 2 respectively show the construction of a compact zoom lens in accordance with Numerical Embodiments 1 and 2 of the present invention at the wide-angle end. The present compact zoom lens may act as a projection zoom lens in an image projection device such as a DMD projector, or a zoom lens in an image pickup device such as a camera. Preferably, the present compact zoom lens is a non-telecentric zoom lens for a high-resolution image projection device for projecting an image formed on an image-forming device (such as a DMD modulator) to a screen, and a high-resolution mobile projector in particular.

As shown in FIGS. 1 and 2, the present compact zoom lens consists of, in order from an object side (or an enlargement side) to an image side (or a reduction side), a first lens group 1, 3 of negative refractive power and a second lens group 2, 4 of positive refractive power. Both the first lens group 1, 3 and the second lens groups 2, 4 are movable. A first variable distance is defined between the first lens group 1, 3 and the second lens group 2, 4. In addition, a cover glass 6 is disposed adjacent to the image side. A second variable distance is defined between the second lens group 2, 4 and the cover glass 6.

The first lens group 1 consists of four lens elements, a positive first lens element 11, a negative second lens element 12, a biconcave third lens element 13 and a positive fourth lens element 14. The first lens element 11 has an object-side convex surface R1 and an image-side planar surface R2. The second lens element 12 has an object-side convex surface R3 and an image-side concave surface R4. The third biconcave lens element 3 has opposite side surfaces R5 and R6. The fourth lens element 14 has an object-side convex surface R7 and an image-side surface R8 that is substantially planar. At least one of the first to fourth lens elements 1-4 of the first lens group 1 is made as an aspheric lens.

The second lens group 2 consists of six lens elements, a positive fifth lens element 21, a positive sixth lens element 22, a biconcave seventh lens element 23, a biconvex eighth lens element 24, and the ninth lens element 25 and the tenth lens element 26 cemented together as a cemented lens element. The positive fifth lens element 21 has an object-side convex surface R9 and an image-side convex surface R10. The positive sixth lens element 22 has an object-side convex surface R11 and an image-side surface R12 slightly concave toward the object side. The seventh biconcave lens element 23 has opposite side surfaces R13 and R14. The eighth lens element 24 is a biconvex lens element and has opposite convex surfaces R15 and R16. The cemented lens element has a substantially planar surface R17, a cemented surface R18 and a surface R19 convex toward the image side. At least one of the fifth to tenth lens elements 21-26 of the second lens group 2 is made as an aspheric lens.

The present compact zoom lens further includes an aperture stop 7 that is located within the second lens group 2. In FIG. 1, the aperture stop 7 is shown to be disposed between the sixth lens element 22 and the seventh lens element 23 of the second lens group 2.

The Numerical Embodiment 2 of the present compact zoom lens is shown in FIG. 2. The differences between Numerical Embodiments 1 and 2 only reside in parameters as provided in detail hereinafter. In Numerical Embodiment 2, the first lens group is designated 3 and is also composed of four lens elements, a first lens element 31, a second lens element 32, a third lens element 33 and a fourth lens element 34. The second lens group 4 also consists of six lens elements, a fifth lens element 41, a sixth lens element 42, a seventh lens element 43, an eighth lens element 44, a ninth lens element 45 and a tenth lens element 46. A cover glass 5 is also disposed adjacent to the image side.

During zooming from the wide-angle end to the telephoto end, the first lens group 1, 3 of the present compact zoom lens moves from the object side to the image side to describe a locus of points convex toward the image side, and at the same time the second lens group 2, 4 also moves linearly toward the object side. Consequently, the first variable distance between the first lens group 1, 3 and second lens group 2, 4 decreases.

The constituent lens elements of the present compact zoom lens include spherical glass lens elements and aspheric plastic lens elements formed by injection molding. Accordingly, the manufacture of the present compact zoom lens is facilitated. Optical performance variations due to temperature fluctuations can be compensated by the distance between the first and second lens groups 1, 2 or the back focal length. Accordingly, image quality degradation of the present compact zoom lens due to temperature changes can be mitigated.

As discussed above, when a zoom lens is employed in a reflecting-type projection optical system, for example a DLP (Digital Light Processing) projector, a reflective modulator (such as the DMD modulator) thereof requires long back focal length because the incoming light path and the reflected light path must stay separate from each other, otherwise the image will be affected. In addition, the optical projection system is required to be compact in configuration and small in overall length while properly correcting various aberrations. The present compact zoom lens meet these requirements by satisfy the following conditions as provided below.

During zooming from the wide-angle end to the telephoto end, the first variable distance between the first lens group 1, 3 and second lens group 2, 4 is decreased. The first lens group 1, 3 and second lens group 2, 4 of the present compact zoom lens satisfies the following condition:

$$0.78 < \left|\frac{f2}{f1}\right| < 0.98 \tag{a-1}$$

where f1 represents the focal length of the first lens group 1, 3, and f2 represents the focal length of the second lens group 2, 4.

The first lens group 1, 3 also satisfies the following condition:

$$1.44 < \left|\frac{f1}{fa}\right| < 1.99 \tag{a-2}$$

where f1 represents the focal length of the first lens group 1, 3, and fa represents the focal length of the entire compact zoom lens of the present invention at the wide-angle end.

If the lower limits of conditions (a-1) and (a-2) are transgressed, the field curvature and other aberrations produced by the second lens group 2, 4 become so large that it is difficult to correct them with the first lens group 1, 3. If the upper limits of conditions (a-1) and (a-2) are transgressed, the movement stroke of the first lens group 1, 3 becomes so long that the overall length of the zoom lens is unduly long.

The second lens group 2, 4 satisfies the following condition:

$$1.387 < \left|\frac{f2}{fa}\right| < 1.55 \tag{a-3}$$

where f2 represents the focal length of the second lens group 2, 4, and fa represents the focal length of the entire compact zoom lens of the present invention at the wide-angle end.

If the lower limit of condition (a-3) is transgressed, the movement stroke of the first lens groups 1, 3 becomes so long that the overall length of the zoom lens is unduly long. If the upper limit of condition (a-3) is transgressed, the lateral chromatic aberrations produced by the second lens group 2, 4 will be overcorrected.

The present compact zoom lens also satisfies the following three conditions:

$$0.58 < \left|\frac{fa}{bf}\right| < 0.68 \tag{a-4}$$

$$4.684 < \left|\frac{tt}{fa}\right| < 5.82 \tag{a-5}$$

$$2.852 < \left|\frac{tt}{bf}\right| < 3.80 \tag{a-6}$$

where fa represents the focal length of the entire compact zoom lens of the present invention at the wide-angle end, bf represents the back focal length of the entire compact zoom lens of the present invention at the wide-angle end, and tt represents the total optical track of the entire compact zoom lens of the present invention at the wide-angle end.

From condition (a-4), it can be seen that the back focal length obtained by the present invention is almost 1.5 to 1.7 times the entire focal length of the present compact zoom lens at the wide-angle end. This back focal length is long enough for a projection optical system. If the upper limits of conditions (a-4), (a-5) and (a-6) are transgressed, the movement stroke of the back focal length of the zoom lens as a whole at the wide-angle end becomes unduly long. If the lower limits of conditions (a-4), (a-5) and (a-6) are transgressed, the refractive powers of the zoom lens as a whole becomes too low, which will adversely affects the optical performance of the zoom lens.

The present compact zoom lens further satisfies the following condition:

$$1.13 < \left|\frac{ex}{bf}\right| < 1.43 \tag{a-7}$$

where ex represents the exit pupil position of the entire compact zoom lens of the present invention at the wide-angle end, and bf represents the back focal length of the entire compact zoom lens of the present invention at the wide-angle end.

If the upper limit of condition (a-7) is transgressed, the refractive power of the zoom lens as a whole becomes too low. If the lower limit of condition (a-7) is transgressed, the zoom lens as a whole substantially becomes a telemetric zoom lens.

The present compact zoom lens further satisfies the following condition:

$$0.649 < \left|\frac{lt}{tt}\right| < 0.723 \qquad (a\text{-}8)$$

where lt represents the overall length from a front vertex of the first lens element 11, 31 to a rear vertex of the last lens element 26, 46 of the present compact zoom lens at the wide-angle end, and tt represents the total optical track of the entire compact zoom lens of the present invention at the wide-angle end.

If the lower limit of condition (a-8) is transgressed, the overall length of the zoom lens as a whole at the wide-angle end becomes too long and thus the back focal length becomes too short. If the upper limit of condition (a-8) is transgressed, the overall length of the zoom lens as a whole at the wide-angle end also becomes too long and thus the back focal length becomes too short.

To correct aberrations, aspheric lenses are employed by the present compact zoom lens. Each of the first lens group 1, 3 and the second lens group 2, 4 includes at least one aspheric lens. The aspheric surfaces of the aspheric lenses are expressed by the following formula:

$$\frac{X(H^2/R)}{\{1 + [1 - 2(1+K)(H/R)]^{1/2}\}} + AH^4 + BH^6 + CH^8 + DH^{10}$$

where X represents displacement in the direction of the optical axis at the position of height H from the optical axis relative to the surface vertex; R is the curvature radius of the aspheric lens surface on the optical axis; H represents a height of a point on the aspheric surface with respect to the optical axis; K represents a cone constant; and A, B, C and D are aspheric coefficients for fourth, sixth, eighth and tenth order terms.

All the construction parameters of the lens elements in the first and second Numerical Embodiments 1 and 2 will be shown below.

In Data Tables 1 and 2 given below corresponding to Numerical Embodiments 1 and 2, "i" represents the order of the surface from the object side (including lens surfaces, the aperture stop 7 and the cover glass 6), "Ri" represents the radius of curvature (mm) of the ith surface, "D" represents the ith member thickness or the distance (mm) between the ith surface and the (i+1)th surface, and "Nd" and "Vd" respectively represent the refractive index (d-line) and Abbe number (d-line) of the ith member. Also, "F" represents the focal length of the present zoom lens as a whole, "W" represents the wide-angle end of the present zoom lens, "M" represents an intermediate zoom position of the present zoom lens, "T" represents the telephoto end of the present zoom lens, and "FNO" represents the effective aperture of the present zoom lens.

DATA TABLE 1

(Numerical Embodiment 1)

| Surface (i) | Ri (mm) | D (mm) | Nd | Vd |
|---|---|---|---|---|
| R1 | 73.1 | 3.5 | 1.7296 | 54.7 |
| R2 | ∞ | 0.1 | | |
| R3 | 36.8 | 1.4 | 1.52467 | 56.4 |
| R4 | 18.2 | 9.5 | | |
| R5 | −49.7 | 0.8 | 1.83400 | 37.2 |
| R6 | 23.1 | 7.2 | | |
| R7 | 41.7 | 5.1 | 1.84666 | 23.8 |
| R8 | 268 | 7.79~4.78~2.19 | | |
| R9 | 38.3 | 3.6 | 1.64000 | 60.1 |
| R10 | −146 | 0.1 | | |
| R11 | 39.2 | 1.8 | 1.70000 | 55.5 |
| R12 | 81.7 | 12.7 | | |
| R13 | −19.8 | 3.5 | 1.70000 | 30.1 |
| R14 | 41.1 | 0.1 | | |
| R15 | 33.9 | 2.9 | 1.52467 | 56.4 |
| R16 | −30.4 | 0.1 | | |
| R17 | −368 | 0.8 | 1.60000 | 35.3 |
| R18 | 40.6 | 3.9 | 1.70000 | 55.5 |
| R19 | −21.7 | 31.50~33.11~34.70 | | |
| R20 | ∞ | 3.00 | 1.49000 | 70.4 |
| R21 | ∞ | 0.50 | | |

According to Numerical Embodiment 1 of the present zoom lens, as shown in FIG. 1, surfaces R3 and R4 of the first lens group 1 and surfaces R15 and R16 of the second lens group 2 are all configured to be aspheric surfaces. That is, both the lens element 12 of the first lens group I and the lens element 24 of the second lens group 2 are aspheric plastic lens elements. Aspheric coefficients for these aspheric surfaces are illustrated below:

| | Coef. | | | | |
|---|---|---|---|---|---|
| Surface (i) | K | A | B | C | D |
| R3 | 1.311048 | −5.4413E−006 | −4.7306E−009 | 1.4581E−011 | 2.7842E−015 |
| R4 | −0.2127355 | 5.1233E007 | −5.9574E−008 | 2.9227E−010 | −8.3619E−013 |
| R15 | −8.378487 | −1.9684E−006 | 6.0245E−008 | −3.8309E−010 | 1.6390E−012 |
| R16 | −2.174905 | 8.5742E−006 | 9.8564E−008 | −6.8565E−010 | 5.0817E−012 |

Related performance parameters of the present compact zoom lens according to Numerical Embodiment 1 are provided below:

$F=21.30(W)\sim22.90(M)\sim24.48(T)$ $FNO=2.44(W)\sim2.54(M)\sim2.66(T)$

Construction parameters of the present compact zoom lens according to Numerical Embodiment 2 are provided in Data Table 2.

DATA TABLE 2

(Numerical Embodiment 2)

| Surface (i) | Ri (mm) | D (mm) | Nd | Vd |
|---|---|---|---|---|
| R1 | 71.7 | 3.7 | 1.72916 | 54.7 |
| R2 | ∞ | 0.1 | | |
| R3 | 31.6 | 1.5 | 1.52467 | 56.4 |
| R4 | 17.0 | 9.1 | | |
| R5 | −56.0 | 0.8 | 1.83400 | 37.2 |
| R6 | 21.8 | 6.8 | | |
| R7 | 37.5 | 6.1 | 1.84666 | 23.8 |
| R8 | 160 | 8.15~4.98~2.53 | | |
| R9 | 39.9 | 3.3 | 1.64000 | 60.1 |
| R10 | −183 | 0.1 | | |
| R11 | 42.1 | 1.9 | 1.70000 | 55.5 |
| R12 | 116 | 12.8 | | |
| R13 | −18.9 | 2.2 | 1.70000 | 30.1 |
| R14 | 36.9 | 0.1 | | |
| R15 | 38.4 | 2.2 | 1.52467 | 56.4 |
| R16 | −36.1 | 0.4 | | |
| R17 | 160 | 0.8 | 1.60000 | 35.3 |
| R18 | 41.4 | 4.0 | 1.70000 | 55.5 |
| R19 | −71.5 | 31.51~33.15~36.61 | | |
| R20 | ∞ | 3.00 | 1.49000 | 70.4 |
| R21 | ∞ | 0.50 | | |

According to Numerical Embodiment 2 of the present zoom lens, as shown in FIG. 2, surfaces R3 and R4 of the first lens group 3 and surfaces R15 and R16 of the second lens group 4 are all configured to be aspheric surfaces. That is, both the lens element 32 of the first lens group 3 and the lens element 44 of the second lens group 4 are aspheric plastic lens elements. Aspheric coefficients for these aspheric surfaces are illustrated below:

| Surface (i) | Coef. | | | | |
|---|---|---|---|---|---|
| | K | A | B | C | D |
| R3 | −0.05624937 | 3.0637E−007 | −1.1501E−008 | 1.4311E−011 | 6.2471E−014 |
| R4 | −0.2017121 | 3.1505E−006 | −6.0864E−008 | 2.2505E−010 | −8.6447E−013 |
| R15 | −1.284966 | −4.7497E−006 | 1.9646E−007 | −1.6049E−009 | 2.9039E−011 |
| R16 | −7.908281 | 1.5023E−005 | 2.9823E−007 | −2.5634E−009 | 4.2934E−011 |

Related performance parameters of the present compact zoom lens according to Numerical Embodiment 2 are provided below:

$$F=21.30(W)\sim22.99(M)\sim24.48(T)$$

$$FNO=2.44(W)\sim2.54(M)\sim2.63(T)$$

Aberrations of the present compact zoom lens according to Numerical Embodiments 1, 2 as show in Data Tables 1, 2 can be effectively corrected and are respectively shown in FIGS. 3A~5E and 6A~8E. Specifically, FIGS. 3A~3E and 6A~6E respectively show various aberrations of Numerical Embodiments 1 and 2 of the present compact zoom lens at the wide-angle end; FIGS. 4A~4E and 7A~7E respectively show various aberrations of Numerical Embodiments 1 and 2 of the present compact zoom lens at the intermediate zoom position; and FIGS. 5A~5E and 8A~8E respectively show various aberrations of Numerical Embodiments 1 and 2 of the present compact zoom lens at the telephoto end. These aberrations include longitudinal spherical aberrations (shown in FIGS. 3A, 4A, 5A, 6A, 7A and 8A), lateral chromatic aberrations (shown in FIGS. 3B, 4B, 5B, 6B, 7B and 8B), field curvatures (shown in FIGS. 3C, 4C, 5C, 6C, 7C and 8C), distortions (shown in FIGS. 3D, 4D, 5D, 6D, 7D and 8D) and MTF (Modulation Transfer Function) curves (shown in FIGS. 3E, 4E, 5E, 6E, 7E and 8E), in which the object distance is 2 meters from the image side or reduction side.

The present zoom lens as described above is actually a reverse-telephoto lens. It should be understandable that, the present zoom lens can be used in an image projection device, such as a projector employing a DMD modulator, to make the projector compact and improve the optical performance of the projector. Moreover, the present zoom lens also can be used in an image pickup device for improving optical performance and reducing the size of the image pickup device. For facilitating understanding, when the present zoom lens is used in an image projection device, the screen surface (onto which an image is projected) is regarded as the object side and the surface of the image display member (for example, a projector employing a DMD modulator) is regarded as the image side; when the present zoom lens is used in an image pickup device, the object to be photographed is defined as the object side and the surface of the image forming member (a photosensitive member, for example, a CCD (Charge Coupled Display)) is defined as the image side.

As described above, according to the concept of the present invention, a two-group zoom lens of a negative-positive configuration is employed. Zooming and focusing are both effected by the movement of the two lens groups. In this way, it is possible to realize a compact zoom lens having a long back focal length satisfactorily correcting various aberrations. When used in a projector employing a DMD modulator, a zoom lens embodying the present invention not only helps miniaturize the projector and enhances the performance thereof, but also makes it possible to project high-quality images. The present compact zoom lens has a reduced overall length of less than 10cm, and is also cost-effective since spherical glass lens elements (which are the majority) and aspheric plastic lens elements are employed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A zoom lens consisting of, in order from an enlargement side to a reduction side, a first lens group of negative refractive power disposed adjacent to the enlargement side, a second lens group of positive refractive power disposed adjacent to the reduction side, and an aperture stop, both the first and second lens groups being movable, the first and second lens groups defining a variable distance therebetween; wherein, during zooming from the wide-angle end to the telephoto end, the second lens group moves toward the enlargement side and the variable distance between the first and second lens groups decreases; and wherein the zoom lens satisfies the following condition:

$$0.649 < \left|\frac{lt}{tt}\right| < 0.723$$

where lt represents the overall length from a front vertex of the first lens element to a rear vertex of the last lens element of the zoom lens at the wide-angle end, and tt represents the total optical track of the zoom lens at the wide-angle end.

2. The zoom lens as claimed in claim 1, wherein, during zooming from the wide-angle end to the telephoto end, the first lens group moves to describe a locus of points convex toward the reduction side.

3. The zoom lens as claimed in claim 2, wherein, during zooming from the wide-angle end to the telephoto end, the second lens group linearly moves toward the enlargement side.

4. The zoom lens as claimed in claim 1, satisfying the following condition:

$$0.78 < \left|\frac{f2}{f1}\right| < 0.98$$

where f1 represents the focal length of the first lens group, and f2 represents the focal length of the second lens group.

5. The zoom lens as claimed in claim 4, wherein the first lens group satisfies the following condition:

$$1.44 < \left|\frac{f1}{fa}\right| < 1.99$$

where f1 represents the focal length of the first lens group, and fa represents the entire focal length of the zoom lens at the wide-angle end.

6. The zoom lens as claimed in claim 5, wherein the second lens group satisfies the following condition:

$$1.387 < \left|\frac{f2}{fa}\right| < 1.55$$

where f2 represents the focal length of the second lens group, and fa represents the entire focal length of the zoom lens at the wide-angle end.

7. The zoom lens as claimed in claim 6, satisfying the following condition:

$$0.58 < \left|\frac{fa}{bf}\right| < 0.68$$

where fa represents the entire focal length of the zoom lens at the wide-angle end, and bf represents the back focal length of the zoom lens at the wide-angle end.

8. The zoom lens as claimed in claim 7, satisfying the following condition:

$$4.684 < \left|\frac{tt}{fa}\right| < 5.82$$

where fa represents the entire focal length of the zoom lens at the wide-angle end, and tt represents the total optical track of the zoom lens at the wide-angle end.

9. The zoom lens as claimed in claim 8, satisfying the following condition:

$$2.852 < \left|\frac{tt}{bf}\right| < 3.80$$

where tt represents the total optical track of the zoom lens at the wide-angle end, and bf represents the back focal length of the zoom lens at the wide-angle end.

10. The zoom lens as claimed in claim 9, satisfying the following condition:

$$1.13 < \left|\frac{ex}{bf}\right| < 1.43$$

where ex represents the exit pupil position of the zoom lens at the wide-angle end, and bf represents the back focal length of the zoom lens at the wide-angle end.

11. The zoom lens as claimed in claim 1, wherein the aperture stop is disposed within the second lens group.

12. The zoom lens as claimed in claim 11, wherein the first lens group comprises a first lens element having a convex enlargement-side surface and a planar reduction-side surface.

13. The zoom lens as claimed in claim 12, wherein the first lens group further comprises a second lens element having a convex enlargement-side surface and a concave reduction-side surface.

14. The zoom lens as claimed in claim 13, wherein the first lens group further comprises a third biconcave lens element.

15. The zoom lens as claimed in claim 14, wherein the first lens group further comprises a fourth lens element having a convex enlargement-side surface and a substantially planar reduction-side surface.

16. The zoom lens as claimed in claim 15, wherein the second lens group comprises a fifth lens element having a convex enlargement-side surface and a convex reduction-side surface and a convex image-side surface.

17. The zoom lens as claimed in claim 16, wherein the second lens group further comprises a sixth lens element having a convex enlargement-side surface and a slightly concave reduction-side surface.

18. The zoom lens as claimed in claim 17, wherein the second lens group further comprises a seventh biconcave lens element.

19. The zoom lens as claimed in claim 18, wherein the second lens group further comprises an eighth biconvex lens element.

20. The zoom lens as claimed in claim 19, wherein the second lens group further comprises a ninth lens element and a tenth lens element cemented with each other to form a cemented lens element.

21. The zoom lens as claimed in claim 20, wherein at least one of the first to fourth lens elements of the first lens group is made aspheric.

22. The zoom lens as claimed in claim 21, wherein at least one of the fifth to ninth lens elements of the second lens group is made aspheric.

23. The zoom lens as claimed in claim 22, wherein the lens elements of the first and second lens groups consist of spherical glass lens elements and aspheric plastic lens elements.

* * * * *